United States Patent [19]

Pogers

[11] 4,069,161

[45] Jan. 17, 1978

[54] PREPARATION OF AQUEOUS SOLUTIONS OF POLYACRYLAMIDES

[76] Inventor: Richard J. Pogers, 1570 Detroit, Denver, Colo. 80206

[21] Appl. No.: 482,811

[22] Filed: June 24, 1974

Related U.S. Application Data

[62] Division of Ser. No. 320,789, Jan. 3, 1973, Pat. No. 3,868,997.

[51] Int. Cl.² ........................... E21B 43/22; B01F 1/00
[52] U.S. Cl. ........................... 252/8.55 D; 106/197 R; 166/275; 260/29.6 H; 528/481; 528/502
[58] Field of Search ............... 252/8.55 R, 8.55 D, 252/316, 363.5; 260/29.6 H; 528/481; 34/5; 106/197 R

[56] References Cited

U.S. PATENT DOCUMENTS

| 2,166,074 | 7/1939 | Reichel | 252/316 |
|---|---|---|---|
| 3,039,529 | 6/1962 | McKennon | 166/275 |
| 3,402,137 | 9/1968 | Fischer et al. | 260/29.6 H |
| 3,455,714 | 7/1969 | Bishop et al. | 252/363.5 X |
| 3,731,414 | 1/1956 | Binder et al. | 252/8.55 |
| 3,743,018 | 7/1971 | Norton et al. | 252/8.55 X |
| 3,850,838 | 11/1974 | Guckenberger et al. | 252/363.5 |

*Primary Examiner*—Herbert B. Guynn

[57] ABSTRACT

Polymer gel, e.g. polyacrylamide gel, is chilled until frozen and is ground up in a mill. The frozen particles of the polymer gel are then dissolved in water to form an aqueous solution having good efficiency in the recovery of petroleum from formations.

5 Claims, No Drawings

PREPARATION OF AQUEOUS SOLUTIONS OF POLYACRYLAMIDES

This is a division of application Ser. No. 320,789, filed Jan. 3, 1973, now U.S. Pat. No. 3,868,997.

BACKGROUND OF THE INVENTION

1. Field of the Invention

The present invention relates to the field of secondary recovery of petroleum from formations and to the preparation of drive fluids for such purposes, generally classified in U.S. Pat. Office Class 166.

2. Description of the Prior Art

The dissolving of polymer gels, e.g. polyacrylamide gels, to prepare aqueous solutions thereof, has previously been accomplished by slowly stirring in dilution water, by high agitation mixing, by roll mixing and by various other techniques. These methods have involved substantial time and have required the storage of relatively large amounts of solution.

SUMMARY OF THE INVENTION

General Statement of the Invention

According to the present invention, a polymer gel, e.g. polyacrylamide gel, is chilled from about $-30°$ to about 320° F, thereby freezing the gel. The frozen gel is ground up in a suitable mill and the resulting particles are added to water and stirred until dissolved, forming an aqueous solution which is then utilized for the supplemented recovery of petroleum from formations, or for other purposes.

Polyacrylamide gel for use in the present invention may be prepared by dissolving acrylamide monomer in deoxygenated water, adjusting the pH to from about 4.2 to about 7.0 by the addition of buffering compounds, a polymerization catalyst, and maintaining the resulting mixture in a quiescent state until polyacrylamide gel is formed.

The present invention is superior to existing methods for the production of aqueous solutions of polymer gels because it reduces the solution time, thereby requiring less time and storage space.

Utility of the Invention

The present invention is useful for a wide variety of purposes including the supplemented recovery of petroleum from formations. By "supplemented recovery of petroleum" is meant a process in which petroleum is displaced within a petroleum-bearing formation through the action of drive fluids. Such recovery may be primary, where the drive fluids are used to supplement the natural gas or water drive of the formation; secondary, where the natural gas or water drive of the formation has been substantially depleted; or tertiary, where the drive fluids are injected after the injection of water flooding media or other conventional displacement fluids. Other uses for the aqueous solutions prepared according to the present invention can include boundary layer fluids for injection along interiors of pipelines to promote the pipelining of high viscosity crude oil and other high viscosity fluids, manometer fluids, etc.

DESCRIPTION OF THE PREFERRED EMBODIMENTS

Starting materials: The starting materials for the present invention are polymers, suitable refrigerant, and dilution water.

Polyacrylamide polymers: The polyacrylamides for use with the present invention may be commercially available unhydrolyzed or partially hydrolyzed polyacrylamides having molecular weights in the range of from above $0.1 \times 10^6$, preferably from $0.5$ to $40 \times 10^6$, more preferably from $1 \times 10^6$ to $15 \times 10^6$, and most preferably from $3 \times 10^6$ to $10 \times 10^6$. Preferably the polyacrylamide will be present in amounts of from 0.001 to about 10, more preferbly from 0.01 to about 1, and most preferably from 0.02 to about 0.2 weight percent based on the weight of the total aqueous solution.

Other polymers: Other polymers may also be used with the present invention. Such polymers may be, but are not limited to, hydroxyethyl cellulose, vinyl acetate-crotonic acid copolymer, and poly vinyl acetate/-polyvinylpyrrolindone.

Refrigerant: Any refrigerant which will freeze the polyacrylamide gel is suitable for use in this invention. If a process is used where the gel comes into direct contact with the refrigerant, the refrigerant must be chosen so as to be inert and unreactive with the gel.

Water: The water used as a solvent for the aqueous solutions of the present invention can be connate water, for example, Palestine lime water, fresh water, or brackish water. It is preferable that the water contain less than about 300,000, more preferably less than about 10,000, and most preferably less than about 500 parts per million of dissolved solids. The resulting aqueous solution of polymer will preferably have a viscosity in the range of from about 2 to about 2000, more preferably from about 5 to about 500, and most preferably from about 10 to about 100 centipoises.

Temperature: The polymer gel may be chilled, e.g., by direct contact with the freezing media which is maintained at a temperature of from about $-30°$ to about $-320°$ F, for a period of from about 1 to about 100, more preferably from 2 to about 60, and most preferably from about 5 to about 30 minutes.

Grinding: The frozen gel may be ground by any suitable mechanical grinder, e.g., a rotary dry-ice pulverizer. Adequate grinding should result in particles of polymer that are from about 10 to about 100,000, more preferably from about 100 to about 10,000, and most preferably from about 250 to about 1000 microns in size.

Screen factor: Testing for "screen factor" is done according to the Society of Petroleum Engineers Paper No. 2867.

Examles: The invention will be more fully understood from the following examples which are taken as being merely illustrative of the invention.

EXAMPLE 1

Polyacrylamide gel is frozen by direct contact with a dry ice acetone bath at a temperature of $-75°$ F for approximately 15 minutes. The frozen gel is then ground in a dry ice pulverizer and the resulting particles are dissolved in an aqueous solution of 3% sodium chloride brine to form a solution concentration of 2500 ppm in the polyacrylamide polymer. The polyacrylamide polymer gel requires only approximately 12 hours to dissolve. This polyacrylamide polymer solution has an intrinsic viscosity of 13.75 deciliters per gram (dl/g), a screen factor of 15.8, and a Brookfield LV-1 viscosity of 22.5 cp.

EXAMPLE 2

Polyacrylamide gel is frozen by direct contact with liquid nitrogen at a temperature of −320° F for approximately 15 minutes. The frozen gel is ground in a dry-ice pulverizer and the resulting particles are dissolved in an aqueous solution of 3% sodium chloride brine to form a solution concentration of about 2500 ppm in the polyacrylamide gel. This polyacrylamide polymer solution has an intrinsic viscosity of 14.6 dl/g, screen factor of 34.5, and a Brookfield LV-1 viscosity of 21.0 cp.

EXAMPLE 3

When the experiment is carried out on other polymer gels, according to the procedures of Examples 1 and 2, similar results are obtained.

EXAMPLE 4

Polyacrylamide polymer is produced by charging a 1½ gallon reactor equipped with a means for hot water heating, mixing, and purging with an inert gas, with 4750 grams of deoxygenated water substantially free from divalent ions. To this is added 250 grams of acrylamide monomer (AAM) powder to produce a concentration of 5.0 weight percent. This mixture is stirred, purged with an inert gas to insure that the mixture remains substantially oxygen-free, and heated to 40° C. for ½ hour. At this time, after the monomer has completely dissolved, 0.0075 mole of trisodium phosphate is added as a buffering compound to adjust the solution pH to 7. Free-radical initiators consisting of 400 ppm ammonium persulfate and 180 ppm sodium bisulfite based on acrylamide monomer charge are added to the reacting mixture. The reacting mixture is stirred slowly for ½ hour to insure complete mixing, and then is allowed to set in a quiescent state for 23½ hours at a temperature of 40° C.

The resulting polyacrylamide gel is then dissolved according to the process in Example 1.

Modifications of the invention: It will be understood that a variety of modifications and variations of the invention will be apparent to those skilled in the art upon a reading of the present specification and that all such modifications and variations are intended to be included within the spirit of the claims appended hereto.

What is claimed is:
1. In a process for the production of aqueous solutions of polymer, the improvement comprising:
   a. chilling, until frozen, a gel of a polymer selected from the group consisting of polyacrylamide, hydroxyethyl cellulose, vinyl acetate-crotonic acid polymer, and polyvinyl acetate/polyvinyl pyrrolidone to within a temperature range of about −30 to about −320° F.,
   b. grinding the gel while chilled to form frozen particles of the polymer having an average particle size in the range of from about 250 to about 1000 microns,
   c. dissolving the ground particles of the polymer gel in water.
2. In a process for the production of aqueous solutions of polyacrylamide, the improvement comprising:
   a. chilling, until frozen, a gel of polyacrylamide to within a temperature range of from about −30° to about −320° F.,
   b. grinding the gel while chilled to form frozen particles of the polymer having an average particle size in the range of from about 250 to about 1000 microns,
   c. dissolving the ground particles of the polymer gel in water.
3. A process for the production of aqueous solutions of polyacrylamide polymer, the improvement comprising in combination:
   a. placing polyacrylamide gel into direct contact with a suitable refrigerant to chill the gel to a temperature of about −30° to about −320° F. until frozen,
   b. grinding the gel while frozen to form particles of polyacrylamide having average particle size in the range of from about 250 to about 1000 microns,
   c. dissolving the ground particles of polyacrylamide gel in water.
4. An aqueous solution of polyacrylamide polymer suitable for use in supplemented recovery of petroleum and prepared according to the process of claim 1.
5. An aqueous solution of polyacrylamide polymer suitable for use in supplemented recovery of petroleum and prepared according to the process of claim 3.

* * * * *

UNITED STATES PATENT OFFICE
CERTIFICATE OF CORRECTION

Patent No. 4,069,161   Dated January 17, 1978

Inventor(s) POGERS, R. J.

It is certified that error appears in the above-identified patent and that said Letters Patent are hereby corrected as shown below:

Assignee: MARATHON OIL COMPANY, Findlay, Ohio

Signed and Sealed this

Twenty-third Day of May 1978

[SEAL]

Attest:

RUTH C. MASON
Attesting Officer

LUTRELLE F. PARKER
Acting Commissioner of Patents and Trademarks